(12) United States Patent
Hobisch et al.

(10) Patent No.: US 7,056,974 B2
(45) Date of Patent: Jun. 6, 2006

(54) ADDITIVES FOR POWDER COATINGS

(75) Inventors: Gerald Hobisch, Graz (AT); Peter Morre, Graz (AT); Roberto Cavalieri, Padua (IT); Sergio Gazzea, Romano D'ezzelino (IT); Robertino Chinellato, Chirignago (IT)

(73) Assignee: Solutia Austria GmbH (AT)

( * ) Notice: Subject to any disclaimer, the term of this patent is extended or adjusted under 35 U.S.C. 154(b) by 0 days.

(21) Appl. No.: 10/967,987

(22) Filed: Oct. 19, 2004

(65) Prior Publication Data

US 2005/0053786 A1  Mar. 10, 2005

Related U.S. Application Data

(62) Division of application No. 10/295,795, filed on Nov. 15, 2002, now abandoned.

(30) Foreign Application Priority Data

Nov. 30, 2001 (AT) .............................. A 1874/2001

(51) Int. Cl.
*C08L 67/00* (2006.01)
(52) U.S. Cl. ...................... 524/513; 524/544; 524/599; 525/169; 526/245
(58) Field of Classification Search ................ 524/513, 524/544, 599; 526/319, 320, 317.1, 329.2, 526/245; 525/169
See application file for complete search history.

(56) References Cited

U.S. PATENT DOCUMENTS

| 5,030,684 A | * | 7/1991 | Rauch-Puntigam et al. . 524/513 |
| 6,710,127 B1 | | 3/2004 | Haubennestel et al. |
| 2001/0005735 A1 | * | 6/2001 | Ring et al. .................. 524/599 |

FOREIGN PATENT DOCUMENTS

EP   1 193 299   4/2002

* cited by examiner

*Primary Examiner*—Bernard Lipman
(74) *Attorney, Agent, or Firm*—Connolly Bove Lodge & Hutz LLP

(57) ABSTRACT

A method of use of copolymers containing fluoro groups and hydroxyl groups as additives in powder coating materials, comprising mixing these component with powder coatings resins, the copolymers comprising units of the following monomers: olefinically unsaturated monomers having from 5 to 40 carbon atoms, at least one hydroxyl group, and at least one free-radically polymerizable C=C double bond, alkyl esters of monoolefinically unsaturated monocarboxylic acids or dialkyl esters of olefinically unsaturated dicarboxylic acids or mixtures thereof, and (per)fluoroalkyl esters of said carboxylic acids, and powder coating materials which comprise these additives for the purpose of improving the flow properties and the surface.

11 Claims, No Drawings

ADDITIVES FOR POWDER COATINGS

CROSS REFERENCE TO RELATED APPLICATION

The present application is a division of application Ser. No. 10/295,795 filed Nov. 15, 2002 now abandoned.

FIELD OF THE INVENTION

The invention relates to the use of fluoro- and hydroxyl group-containing copolymers as additives for powder coating materials.

BACKGROUND OF THE INVENTION

Powder coating materials are a cost-effective and environmentally friendly alternative to liquid paints. Crosslinking of the binders to form a protective paint film is generally effected by thermal activation, the coated articles being subjected in an oven to a temperature of customarily from about 160 to about 200° C. As the substrate is heated, the powder melts, within a temperature range of customarily from about 80 to about 120° C., and runs out to form a uniform film, which on further heating (from about 110 to about 140° C.) finally cures as a result of the onset of the thermally activated crosslinking reaction. Depending on the reactivity of the system used, complete crosslinking takes between 10 and 30 minutes.

Since there is an overlap between the temperature ranges of the melting process and the crosslinking process, and since as well the heating of the powder coating layer on the substrate is never entirely homogeneous, melting and crosslinking occasionally take place simultaneously; the beginning of crosslinking is also coupled with a drastic increase in the viscosity, which impedes flow and hence the formation of an even surface. In practice, therefore, uneveness in the coating is frequently observed: terms such as "orange peel" and "craters" are used where the particle structure of the applied powder coating material is still more or less visible. Where the substrate is insufficiently wetted by the melted coating material, small punctures can be seen in the coating, which look like pricks from a needle and are therefore generally referred to as "pin holes".

It is therefore an object of the invention to modify powder coating materials such that during the melting process the viscosity is as low as possible and an appropriate surface tension is obtained without signs of running ("curtains") being visible on inclined or vertical surfaces.

This object can be achieved in accordance with the invention by adding certain additives to powder coating materials, the additives used being certain fluoro- and hydroxyl group-containing polymers. These additives enhance the levelling of the coating materials and prevent or render less visible the surface defects described above.

Fluoro- and hydroxyl group-containing copolymers are known from EP-A 0 849 283.

They are in the form of nonaqueous dispersions, and are combined with hydroxyl group-containing resins and crosslinkers together to form coating compositions. Their use as additives to powder coating materials is not described.

Copolymers of hydroxyalkyl acrylates and fluoroalkyl acrylates are also known from WO-A 97/01 114, EP-A 0 620 455, EP-A 0 563 047, and EP-A 0 167 634, and are used for contact lenses. The use of these copolymers as additives to powder coating materials is not described.

Moreover, the use of such copolymers as additives for anionically stabilized aqueous coating compositions (EP-A 0 362 643) and (copolymerized with certain silanes) as photopolymerizable adhesives (EP-A 0 583 471) is known. Here again, their use as additives to powder coating materials is not described.

SUMMARY OF THE INVENTION

The present invention accordingly provides for the use of copolymers containing fluoro groups and hydroxyl groups as additives in powder coating compositions, said copolymers comprising units of the following monomers:
a) olefinically unsaturated monomers having from 5 to 40 carbon atoms, with at least one hydroxyl group and at least one free-radically polymerizable C=C double bond,
b) alkyl esters of mono-olefinically unsaturated monocarboxylic acids or dialkyl esters of olefinically unsaturated dicarboxylic acids or mixtures thereof, the alkyl radicals having from 1 to 18 carbon atoms and the carboxylic acids from 3 to 12 carbon atoms,
c) (per)fluoroalkyl esters of the carboxylic acids stated under b, the (per)fluoroalkyl group having from 2 to 20 carbon atoms, and also, if desired,
d) olefinically unsaturated copolymerizable monomers which are free from hydroxyl groups, acid groups, amide groups and fluorine groups, and which do not belong to group b, and
e) the olefinically unsaturated carboxylic acids stated under b and/or the monoalkyl esters of the olefinically unsaturated dicarboxylic acids stated under b with $C_1$ to $C_{20}$ alkyl radicals, the polymer comprising the stated monomer units preferably in the following mass fractions (mass of the units derived from the monomers in question, divided by the mass of the polymer, in "%"=cg/g or g/100 g):
a: from 5 to 50%; preferably from 7 to 40%; in particular from 9 to 35%;
b: from 35 to 94.8%; preferably from 40 to 93%; in particular from 45 to 91%;
c: from 0.2 to 15%; preferably from 1 to 12%; in particular from 2 to 10%;
d: from 0.2 to 15%, where present; and
e: from 0.2 to 15%; preferably from 1 to 12%; in particular from 2 to 10%;
where present, the sum of the mass fractions always necessarily being 100%.

The present invention further provides for the use of the copolymers of the invention as additives for powder coating materials based on saturated or unsaturated polyesters for the purpose of improving the flow and the quality of the surface of the coatings produced therewith.

The present invention additionally provides powder coating materials, especially those based on polyesters, which comprise the copolymers of the invention as additives, preferably powder clearcoat materials, and also provides the articles coated therewith.

DETAILED DESCRIPTION OF THE PREFERRED EMBODIMENTS

The copolymers customarily have a hydroxyl number of from 15 to 250 mg/g, preferably from 20 to 200 mg/g. The hydroxyl number, called "OHN" below, is defined in accordance with DIN 53 240 as the ratio of that mass $m_{KOH}$ of potassium hydroxide which has exactly the same number of hydroxyl groups as a sample under analysis to the mass $m_B$ of that sum (mass of the solid in the sample in the case of solutions or dispersions); its customary unit is "mg/g".

The number-average molar mass $M_n$ (determined by gel permeation chromatography using polystyrene as standard) of the copolymers is customarily between 1000 and 100 000 g/mol, but preferably between 1500 and 20,000 g/mol. The monomers a are preferably hydroxyalkyl esters of olefinically unsaturated carboxylic acids a1, the hydroxyalkyl group being linear, branched or cyclic, containing from 2 to 12 carbon atoms, preferably up to 6, and in particular up to 4 carbon atoms, and being preferably selected from the following radicals: 2-hydroxyethyl, 2-hydroxypropyl, 1-hydroxy-2-propyl, 3-hydroxypropyl, 2,2-dimethyl-3-hydroxypropyl, 4-hydroxybutyl, 2-hydroxybutyl, and 6-hydroxyethyl. The olefinically unsaturated carboxylic acids are preferably selected from acrylic acid, methacrylic acid, vinyl acetic acid, crotonic acid and isocrotonic acid. Likewise suitable are bishydroxyalkyl esters of olefinically unsaturated dicarboxylic acids a2 such as the bis(2-hydroxyethyl) esters and bis(hydroxy-propyl)esters of maleic, fumaric, itaconic, citraconic or mesaconic acid, and also monohydroxyalkyl esters of said acids, the remaining carboxyl group being esterified with a linear, branched or cyclic alkanol having from 1 to 20 carbon atoms.

Particular preference is given to hydroxyethyl (meth)acrylate, 3-hydroxypropyl (meth)acrylate, and the mixtures available commercially, which are referred to as hydroxypropyl (meth)acrylate, of the isomeric adducts of methyloxirane with (meth)acrylic acid, these mixtures containing 2-hydroxypropyl (meth)acrylate and 1-hydroxypropyl 2-(meth)acrylate, in each case alone or in a mixture with one another.

The monomers b are alkyl esters of monoolefinically unsaturated monocarboxylic acids as stated under a1 or dialkyl esters of olefinically unsaturated dicarboxylic acids as stated under a2 or mixtures thereof, the alkyl radicals being linear, branched or cyclic and having from 1 to 20 carbon atoms and the carboxylic acids having from 3 to 12 carbon atoms. Preference is given to esters of acrylic or methacrylic acid and also of maleic acid with the alcohols methanol, ethanol, n- and iso-propanol, n-, iso-, sec- and tert-butanol, amyl alcohol, n-hexanol, cyclohexanol, and 2-ethylhexanol. Particular preference is given to methyl methacrylate, ethyl (meth)acrylate, n-butyl (meth)acrylate, dimethyl maleate, and 2-ethylhexyl (meth)acrylate.

The monomers c are (per)fluoroalkyl esters of the carboxylic acids stated under a1, the (per)fluoroalkyl group having from 2 to 20 carbon atoms. Suitable examples include trifluoroethyl (meth)acrylate, hexafluoroisopropyl (meth)acrylate, heptafluorobutyl (meth)acrylate, and perfluorooctyl (meth)acrylate. The higher perfluoroalkanols are preferably obtained conventionally by telomerization of tetrafluoroethylene and are then converted into the desired esters $C_nF_{2n+1}$—O—CO—R where n=2 to 20. Also suitable are esters of partly fluorinated alcohols, in which context the commercially available mixtures of the 2-perfluoroalkyl ethyl esters of acrylic and methacrylic acid are particularly preferred.

Further monomers which may be used where appropriate to synthesize the copolymers are those of group d, namely olefinically unsaturated copolymerizable monomers which are free from hydroxyl groups, acid groups, amide groups and fluoro groups, and which do not belong to group b, and those of group e, namely the olefinically unsaturated carboxylic acids stated under a1 and/or the monoalkyl esters of the olefinically unsaturated dicarboxylic acids stated under a2, with linear, branched or cyclic $C_1$ to $C_{20}$ alkyl radicals.

The monomers d also include vinylaromatic compounds such as styrene, α-methylstyrene, the isomeric vinyltoulenes and mixtures thereof, chlorostyrene, and also vinyl esters of aliphatic linear, branched or cyclic carboxylic acids having from 1 to 20 carbon atoms, especially vinyl acetate, the vinyl ester of 2-ethylhexanoic acid and the vinyl esters of α-branched aliphatic carboxylic acids having from 5 to 12 carbon atoms (known as Koch acids or ®Versatic acids), vinyl halides such as vinyl chloride and vinylidene chloride, and nitriles such as acrylonitrile and methacrylonitrile.

Preferred monomers e are acrylic acid, methacrylic acid and mixtures thereof.

The copolymers of the invention are prepared by free-radical copolymerization in a suitable solvent, which is preferably removed by distillation after the preparation.

The copolymers are used as additives for improving the leveling and the surface in powder coatings. For this purpose they are admixed to the resins, and pigments where appropriate, and other adjuvants and are homogenized with them in conventional manner, by melting and mixing below the crosslinking temperature. The mass fraction of these copolymers as additives in the finished powder coating material is customarily from 0.1 to 3%, preferably from 0.2 to 2%, and in particular from 0.3 to 1%.

The copolymers may also be premixed preferentially with the resins which are used as binders in the powder coating materials or with other resins which are solid at room temperature (20° C.), examples being saturated polyester resins. For this purpose, the mixtures of resins and the copolymers may be homogenized together in the melt and comminuted after cooling. The result of such an operation is referred to as a masterbatch. The resins are melted with the copolymers, for example, in an extruder and homogenized, and, after cooling, the extrudate is ground to the desired degree of fineness. The mass fraction of the copolymer in the mixture of resin and copolymers is customarily between 2 and 30%, preferably between 4 and 20%, and in particular from 6 to 15%.

A further possibility is to coat the copolymers in liquid form (as a melt or solution) onto finely divided silicon dioxide (silica). The resultant powder flows readily and does not tend to stick. This powder is easy to mix into the desired powder coating formulation.

The powder coating materials modified in this way can be used for coating, for example, metals such as, in particular, steel, aluminum, copper, and also plastics, wood, and natural and artificial stone.

The following examples shall serve to illustrate the invention without narrowing its scope.

EXAMPLES

1 Preparation of the Additives:

An appropriate reaction vessel with stirrer and reflux condenser was charged with the solvent, and the apparatus was evacuated and blanketed with nitrogen. The solvent was then heated to reflux temperature and the monomer mixture and initiator solution were added simultaneously and at a uniform rate over the time stated (see Table 1). After the end of the addition, the temperature was maintained for two more hours with further stirring, in order to finish the reaction, and then the solids content of the reaction solution was determined for the purpose of checking the conversion. When the desired solids content had been reached (for which stirring at the reaction temperature was continued for as long as necessary), the solvent was removed by distillation under reduced pressure, to give a solids content (mass fraction of solids) of more than 97%.

3 Testing of the Additives:

The additives of the invention were tested in a powder coating material based on a polyesterresin ((®Alftalat AN 725 from Solutia Italy S.p.A., saturated polyester having a

TABLE 1

Monomer composition, polymerization conditions, and characteristics of the copolymers (B1 through B5, and comparison C) obtained

| | | B1 | B2 | B3 | B4 | B5 | C (Comparison) |
|---|---|---|---|---|---|---|---|
| | Monomers (mass in g) | | | | | | |
| A | Hydroxyethyl acrylate | 10 | — | — | 15 | 25 | — |
| | Hydroxyethyl methacrylate | — | — | 30 | — | — | — |
| | 4-Hydroxybutyl acrylate | — | 13 | — | — | — | — |
| B | Methyl methacrylate | 5 | 10 | — | — | 10 | 15 |
| | Ethyl acrylate | 10 | — | — | 10 | — | 20 |
| | Butyl acrylate | 30 | 40 | 20 | 20 | 15 | 15 |
| | 2-Ethylhexyl acrylate | 40 | 25 | 30 | 40 | 40 | 40 |
| C | 2-Perfluoro alkyl acrylate* | 3 | 5 | — | — | 8 | — |
| | 2-Perfluoro alkyl methacrylate** | — | — | 7 | 5 | — | — |
| D | Styrene | — | — | 13 | 10 | 2 | 5 |
| E | Acrylic acid | 2 | — | — | — | — | 5 |
| | Methacrylic acid | — | 7 | — | — | — | — |
| | Mass ratio of initiator to monomers in % | | | | | | |
| | Di-t-butyl peroxide | — | 1.5 | — | 2 | — | — |
| | Azobisisovaleronitrile | 1 | — | 1.8 | — | 1.5 | 1 |
| | Butyl acetate | 70 | — | — | — | — | 75 |
| | Butanol | — | 60 | — | — | 80 | — |
| | Isopropanol | — | — | 75 | — | — | — |
| | Methoxy propanol | — | — | — | 50 | — | — |
| | Time of addition in h | 6 | 6 | 8 | 6 | 12 | 8 |
| | Polymerization temperature in ° C. | 120 ... 125 | 118 ... 124 | 82 ... 86 | 115 ... 120 | 118 ... 124 | 120 ... 125 |
| | OHN of the copolymer in mg/g | 49 | 51 | 129 | 74 | 123 | 0 |

*® Zonyl TA-N, DuPont, 2-perfluoroalkylethyl acrylate with a perfluoroalkyl radical chain length of from 6 to 18 carbon atoms
**® Fluowet AC 600, Clariant, 2-perfluoroalkylethyl acrylate with a perfluoroalkyl radical chain length of from 4 to 10 carbon atoms 2 Preparation of a Masterbatch:

In a reaction vessel, 473 g of neopentyl glycol, 669 g of propylene glycol, 3 g of monobutyltin oxide, 72 g of trimethylolpropane and 2037 g of terephthalic acid were mixed thoroughly and heated slowly to 240° C. The water formed during the esterification was distilled off first at atmospheric pressure and later under reduced pressure. When an acid number of 5 mg/g and a melt viscosity of 5000 mPa·s at 200° C. had been reached, the reaction mixture was cooled to 190° C. and 310 g of the copolymer B1 from Example 1 were added. The mixture was homogenized with stirring for 15 minutes, then poured out onto a metal cooling tray and crushed. The material was called M1.

The batch was repeated but replacing the copolymer B1 from Example 1 that was added to the polyester melt by equal amounts of each of the other copolymers B2 to B5 and C from Example 1. The mixtures prepared in this way were called M2 to M5 and, as the mixture for comparison, MC.

The acid number is defined in accordance with DIN EN ISO 3682 (DIN 53 402) as the ratio of that mass $m_{KOH}$ of potassium hydroxide which is needed to neutralize a sample under analysis to the mass $m_B$ of that sample (mass of the solid in the sample in the case of solutions or dispersions); its customary unit is "mg/g".

melting temperature of approximately 80° C. and an acid number of approximately 34 mg/g), using the following formulation:

Powder Coating P1

| | |
|---|---|
| Polyester resin | 865 g |
| Triglycidyl isocyanurate | 70 g |
| Mixture M1 from Example 2 | 60 g |
| Benzoin | 5 g |

The powder clearcoat composition was melted and homogenized in a twin-screw extruder (temperature zones: 80° C./100° C./100° C.) with a screw speed of 300/min. The extrudate was cooled and ground to give a powder coating material P1 having an average particle size of approximately 40 μm.

Powder coatings P2 to P5 and PC were prepared similarly using the mixtures M2 to M5 and MC from Example 2.

Norton Flow Test:

For this test, 0.5 g of each of the ready-to-apply powder coating materials was applied to a glass plate in the form of a round pile having a diameter of 25 mm and was cured at 180° C. with an inclination of 60°. For evaluation, the flow path was drawn from the point of application up to the front flow edge (measured in mm). The better the flow properties, the longer the flow path.

Production of the Coating and its Assessment:

The powder coating materials P1 to P5 and PC were applied using corona guns to steel plates and were cured at 180° C. for 20 minutes. This gave coating films having a thickness of from about 60 to 70 μm.

Leveling, craters, pin holes (pinpricklike surface irregularities), and transparency were assessed in accordance with the methods indicated.

The results of the flow test and the assessment of the coatings are summarized in Table 2.

TABLE 2

Efficacy of the additives from Example 1

| Powder coating | P1 | P2 | P3 | P4 | P5 | PC |
|---|---|---|---|---|---|---|
| Flow test in mm | 57 | 65 | 59 | 68 | 63 | 46 |
| Leveling | 5 | 6 | 5 | 7 | 5 | 3 |
| Craters | 1 m 1 g | 0 m 0 g | 0 m 0 g | 0 m 0 g | 1 m 1 g | 3 m 2 g |
| Pinholes | 1 m 1 g | 0 m 0 g | 0 m 0 g | 0 m 0 g | 0 m 0 g | 2 m 1 g |
| Transparency | good | good | good | very good | good | still good |

Key:
Leveling: visual assessment of 10 = very good to 0 = poor
Crater and pinholes: visual assessment in accordance with DIN 53230
0 m 0 g = very good . . . 5 m 5 g = very poor
Transparency: visual assessment It can be seen that by using the additives of the invention the flowability prior to the onset of crosslinking is improved. This is evident both from the (objective) measure from the flow test and from the visual assessment of the surface of the cured coating in accordance with various criteria. In the case of the comparative specimen (PC), the structure of the applied powder coating particles was still discernible on the surface.

What is claimed is:

1. A powder coating material comprising powder coating resins which are solid at 20° C. and copolymers containing units of the following monomers:
   a) olefinically unsaturated monomers having from 5 to 40 carbon atoms, with at least one hydroxyl group and at least one free-radically polymerizable C═C double bond,
   b) alkyl esters of monoolefinically unsaturated monocarboxylic acids or dialkyl esters of olefinically unsaturated dicarboxylic acids or mixtures thereof, the alkyl radicals having from 1 to 18 carbon atoms and the carboxylic acids from 3 to 12 carbon atoms,
   c) (per)fluoroalkyl esters of the carboxylic acids stated under b, the (per)fluoroalkyl group having from 2 to 20 carbon atoms obtained by melting and homogenising the mixture of the said powder coating resins with the said copolymers at a temperature below the curing temperature of the said mixture of from about 110° C. to about 140° C.

2. The powder coating material of claim 1, wherein the copolymers contain the stated monomer units in the following mass fractions in the polymer:
   a: from 5 to 50%;
   b: from 35 to 94.8%;
   c: from 0.2 to 15%, the sum of the mass fractions always necessarily being 100%.

3. The powder coating material of claim 1, wherein the copolymers further include units derived from
   d) olefinically unsaturated copolymerizable monomers which are free from hydroxyl groups, acid groups, amide groups, and fluorine groups, and which do not belong to group b.

4. The powder coating material of claim 3, wherein the copolymers further include units derived from
   e) the olefinically unsaturated carboxylic acids stated under b and/or the monoalkyl esters of the olefinically unsaturated dicarboxylic acids stated under b with $C_1$ to $C_{20}$ alkyl radicals.

5. The powder coating material of claim 3, wherein the units derived from the monomers d are present in the copolymer in a mass fraction of from 0.2 to 15%.

6. The powder coating material of claim 4, wherein the units derived from the monomers e are present in the copolymer in a mass fraction of from 0.2 to 15%.

7. The powder coating material of claim 1, wherein the monomers a are hydroxyethyl (meth)acrylate, 3-hydroxypropyl (meth)acrylate, 2-hydroxypropyl acrylate and/or 1-hydroxypropyl-2-acrylate.

8. The powder coating material of claim 1, wherein the monomers b are methyl methacrylate, ethyl (meth)acrylate, n-butyl (meth)acrylate, dimethyl maleate and/or 2-ethylhexyl (meth)acrylate.

9. The powder coating material of claim 1, wherein the monomers c are trifluoroethyl (meth)acrylate, hexa fluoroisopropyl (meth)acrylate, heptafluorobutyl (meth)acrylate and/or perfluorooctyl (meth) acrylate.

10. The powder coating material of claim 1, wherein the copolymers are present in the finished powder coating material in a mass fraction of from 0.1 to 3%.

11. The powder coating material of claim 1 wherein the powder coating resins which are solid at room temperature (20° C.) are selected from the group consisting of unsaturated and saturated polyesters.

* * * * *